Figure 1:
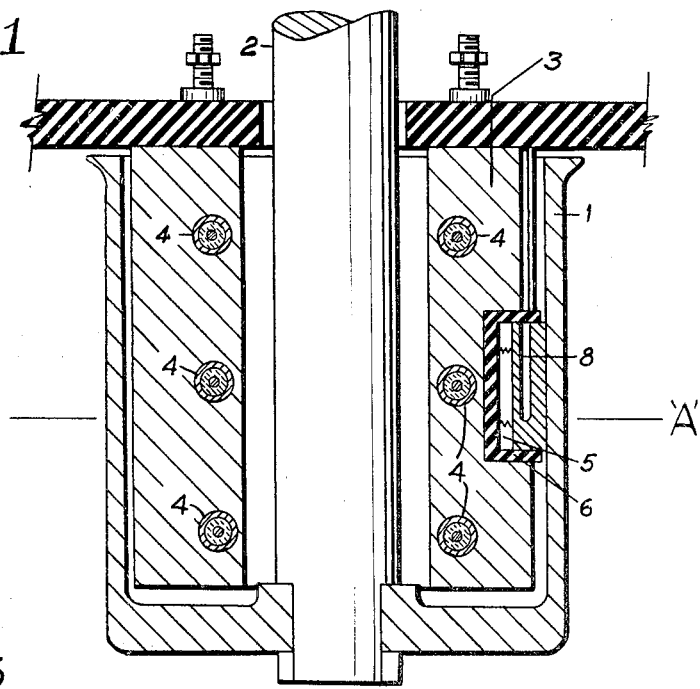

Oct. 12, 1965  G. E. BARLOW ETAL  3,211,893

TEMPERATURE CONTROLLED ELECTRICALLY HEATED ROLLER

Filed Feb. 6, 1963

INVENTORS
GEORGE EDWARD BARLOW
THOMAS COCHRANE
BY
Cushman, Darby & Cushman
ATTORNEYS

United States Patent Office 3,211,893
Patented Oct. 12, 1965

3,211,893
TEMPERATURE CONTROLLED ELECTRICALLY HEATED ROLLER
George Edward Barlow and Thomas Cochrane, Harrogate, England, assignors to Imperial Chemical Industries Limited, London, England, a corporation of Great Britain
Filed Feb. 6, 1963, Ser. No. 256,679
Claims priority, application Great Britain, Feb. 19, 1962, 6,292/62
7 Claims. (Cl. 219—469)

This invention relates to an apparatus for measuring and controlling the temperature of electrically heated moving bodies such as rollers.

It is frequently necessary to control accurately the temperature of electrically heated bodies. For example, in the manufacture of artificial filaments it is common practice to heat the filaments during processing, by passing them in contact with heated surfaces such as hot metal plates, the temperature of which must be known and controllable within fine limits. In certain processes related to the manufacture of artificial filaments it is necessary to heat the filaments whilst they are being forwarded by means of hot driven rollers. Hitherto this method has not been successful because of the difficulty of measuring and controlling accurately the temperature of the heated rolls.

It is an object of our invention to provide an apparatus whereby the temperature of a rotating heated roller may be accurately measured and controlled.

According to the present invention apparatus for measuring and controlling the temperature of a hollow rotating roller comprises a heated, stationary, substantially cylindrical, metal block located within and substantially coaxial with the roller, a cavity in the surface of said metal block containing a highly thermally conductive slipper in combination with a temperature sensing element, and temperature controlling means, said slipper being thermally insulated from the heating means and loaded so as to bear against the inner surface of the roller, and in good thermal contact with it.

The metal block, used to provide heat to the rotating roller, may be heated by any known means such as hot vapours or liquids or electrical resistance. We have found that a sheathed electrical resistance heater formed into a helical or zig-zag form and then embedded in an aluminium cylinder to be very satisfactory.

The cavity may be any convenient length and we prefer a cavity one inch long located centrally in the top of the cylinder in a direction substantially parallel to its axis.

The thermally conductive slipper may comprise any suitable material such as copper, silver or aluminium. We prefer to use sintered bronze impregnated with a lubricant for example polytetrafluoroethylene so as to avoid frictional heating of the slipper.

The temperature sensing element may comprise any suitable device. A themocouple gives very satisfactory results.

The temperature controlling means within the slipper may be the bulb of a vapour pressure type thermostat, a thermistor or other temperature control system.

The thermally conductive slipper is preferably loaded against the inner wall of the roller by springs or other pressure means, so that the pressure on the face of the slipper does not exceed 24 ounces per square inch. The slipper should preferably be thermally insulated from the heating block using any known methods of lagging, we have found for example that a "Tufnol" sheet is very suitable.

The heated roller may be driven by any suitable means and in one form of our invention the drive shaft passes through the heating cylinder which is adapted to allow the shaft to rotate freely.

One embodiment of the invention will now be described by way of example with reference to the accompanying drawings in which:

FIGURE 1 diagrammatically shows a cross section through an apparatus for measuring and controlling the temperature of a rotating roller and for heating the roller.

Figure 2:
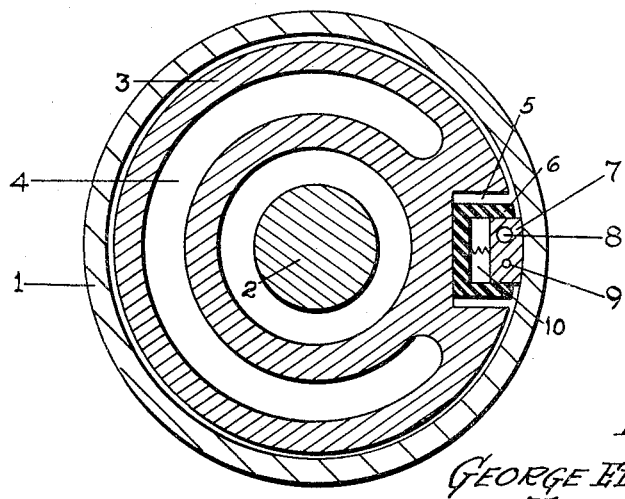

FIGURE 2 diagrammatically shows a cross section of the apparatus at right angles to that in FIG. 1 taken across the line AA'.

Figure 3:
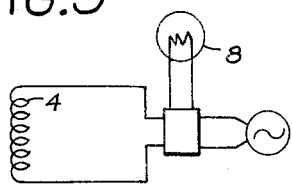

FIGURE 3 diagrammatically shows a circuit for controlling the heating means.

Referring now to FIG. 1, a roll 1 is connected to a shaft 2 which passes through a stationary aluminium cylinder 3 in which a resistance heater 4 is embedded. The aluminium cylinder 3 is fixedly attached to a plate 11 which is part of a main supporting member and which is provided with electrical terminals 12 for the heater 4. A cavity 5 in cylinder 3 is lined with "Tufnol" sheet 6. Within the "Tufnol" cavity there is a sintered bronze slipper 7 containing the bulb 8 of a thermistor (not shown) and a thermocouple 9 (FIG. 2). The slipper 7 is held in close contact with the the inner wall of the roll 1 by the spring 10. In operation, that is with the roller rotating, the temperature of the slipper soon reaches substantial equilibrium with the temperature of the inside wall of the roll and the thermistor assumes its control function. Thus by controlling the heat input to the cylinder 3 in accordance with the temperature of the slipper a satisfactory degree of control is exercised over the surface temperature of the roll.

In FIGURE 3 it will be seen that the heat input to the cylinder 3 may be readily controlled by connecting the thermistor 8 in a manner to reduce or increase the current flow to the resistance element 4 in accordance with an increase or decrease, respectively, in the temperature sensed by the thermistor 8.

We have used the apparatus of the present invention to control the temperature of the heated feed rolls of a drawframe used for drawing spun yarns of synthetic linear polymers, in particular polyethylene terephthalate. In a specific embodiment of the invention in this application when using a mild-steel, chromium plated roll with a wall thickness of up to 0.375" and with an air gap of 0.010" between the roll and the heater cylinder, the roll temperature could be controlled within ±1° C. throughout the range 80° C. to 130° C., at peripheral roll speeds of 500–3,000 ft./min. With the 0.010" clearance the temperature of the aluminium block is 30° C.–35° C. higher than the controlled temperature.

What we claim is:

1. In an apparatus which includes a hollow rotatable roller and means for heating said roller, the improvement in said heating means which comprises: a stationary substantially cylindrical thermally conductive block mounted substantially coaxially within and out of contact with said roller, said block having a cavity in its surface; means for heating said block; a highly thermally conductive slipper mounted in said cavity; means thermally insulating said slipper from said block; means yieldably urging said slipper into thermal contact with the inner surface of said hollow roller; means for producing a signal which is a measure of the temperature of said slipper, said signal producing means including a temperature responsive element carried by said slipper; and means for varying the output of said heating means in accordance with said signal.

2. Apparatus according to claim 1 wherein said heating means includes an electrical resistance embedded within said block.

3. Apparatus according to claim 1 wherein the temperature sensing means is a thermocouple.

4. Apparatus according to claim 1 wherein said temperature responsive element is a thermistor.

5. Apparatus according to claim 1 wherein said urging means includes a spring.

6. Apparatus as in claim 1 wherein said slipper is constructed of sintered metal impregnated with a lubricant.

7. Apparatus as in claim 6 wherein said sintered metal is sintered bronze and wherein said lubricant is polytetrafluoroethylene.

References Cited by the Examiner

UNITED STATES PATENTS

| | | | |
|---|---|---|---|
| 1,509,869 | 9/24 | Harvey | 73—75 |
| 1,972,133 | 9/34 | Darrow | 83—16 |
| 2,114,029 | 4/38 | Perry | 73—351 X |
| 2,294,339 | 8/42 | Hofmann et al. | 73—351 X |
| 2,627,182 | 2/53 | Quereau et al. | 73—351 X |
| 2,777,931 | 1/57 | Bundegaard et al. | 219—470 |
| 2,834,860 | 5/58 | Claiborne et al. | 219—469 |
| 2,866,881 | 12/58 | McMillen | 219—522 |
| 2,920,176 | 1/60 | Jorgensen | 219—388 |

RICHARD M. WOOD, *Primary Examiner.*